Figure 1:
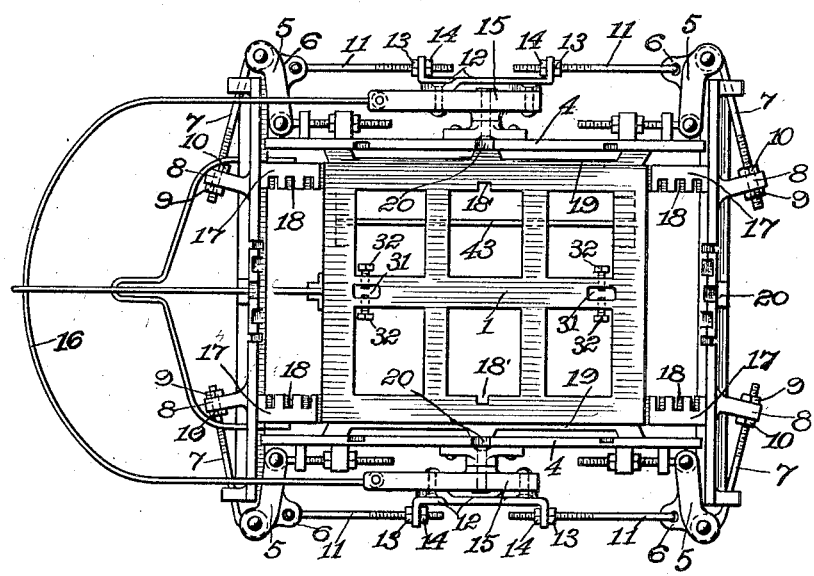

J. H. HOLLAND.
CONCRETE BLOCK MOLDING MACHINE.
APPLICATION FILED AUG. 18, 1910.

1,057,550.

Patented Apr. 1, 1913.
7 SHEETS—SHEET 1.

Witnesses:

JOSEPH H. HOLLAND
Inventor

By

Attorneys

J. H. HOLLAND.
CONCRETE BLOCK MOLDING MACHINE.
APPLICATION FILED AUG. 18, 1910.

1,057,550.

Patented Apr. 1, 1913.
7 SHEETS—SHEET 2.

Witnesses:

JOSEPH H. HOLLAND
Inventor

By

Attorneys

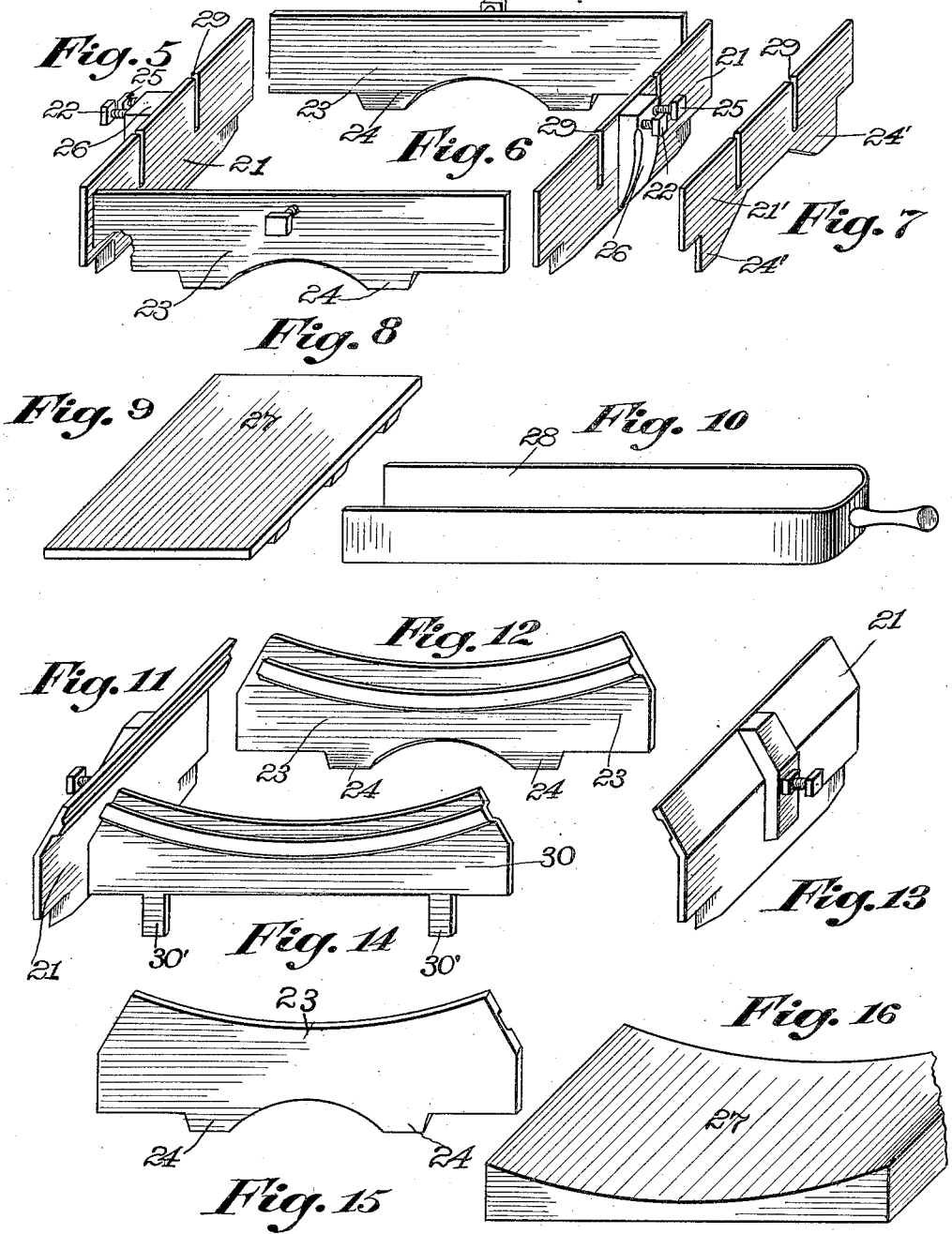

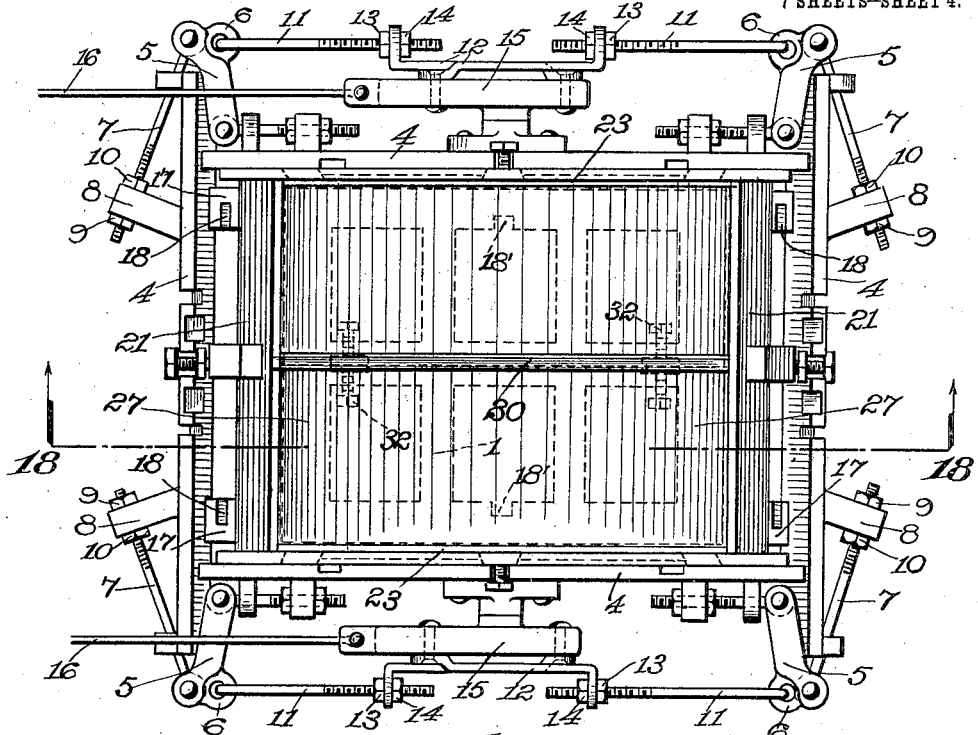
Fig. 17
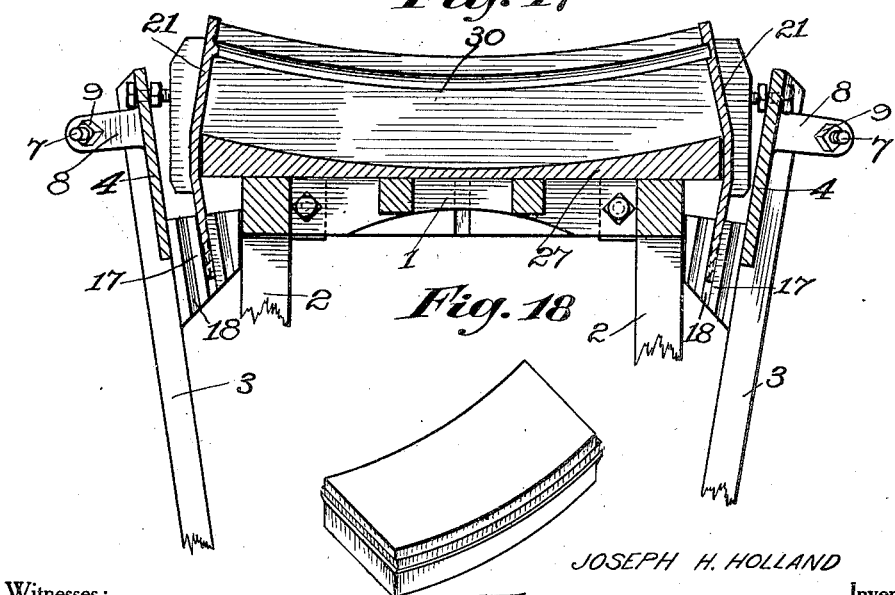
Fig. 18
Fig. 19
JOSEPH H. HOLLAND

J. H. HOLLAND.
CONCRETE BLOCK MOLDING MACHINE.
APPLICATION FILED AUG. 18, 1910.
1,057,550.
Patented Apr. 1, 1913.
7 SHEETS—SHEET 5.
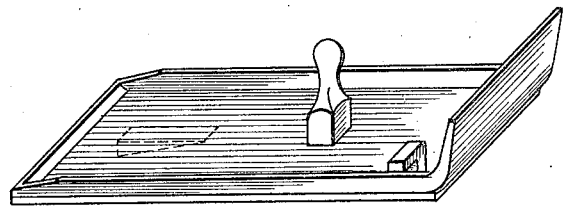
Fig. 24
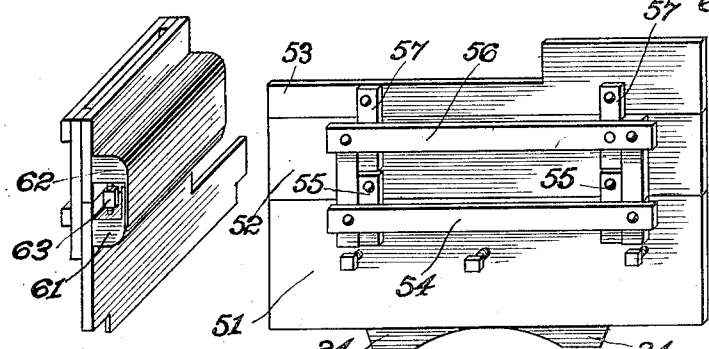
Fig. 20   Fig. 21   Fig. 22
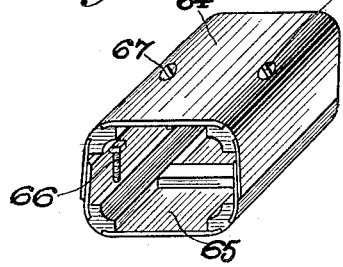   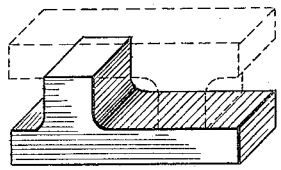   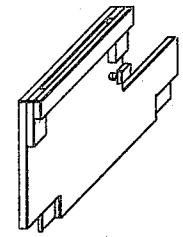
Fig. 23   Fig. 25   Fig. 39
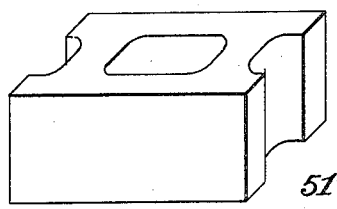   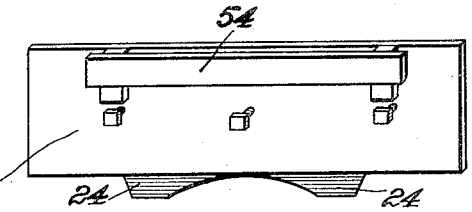
Fig. 38   Fig. 40
JOSEPH H. HOLLAND
Inventor
Witnesses:
By
Attorneys

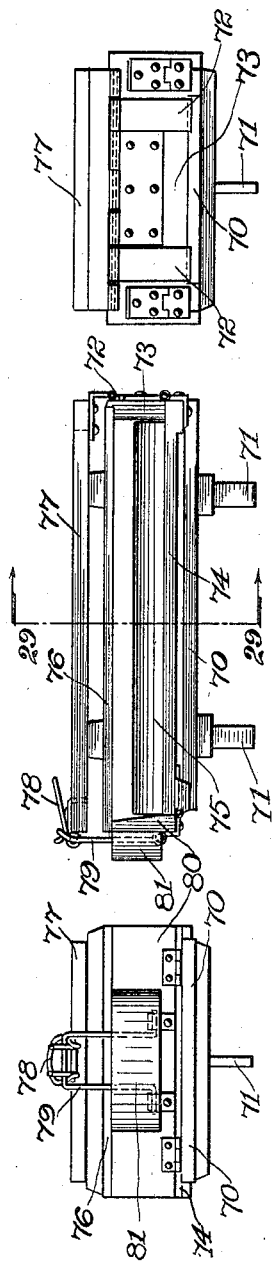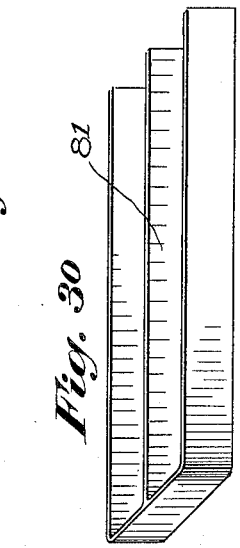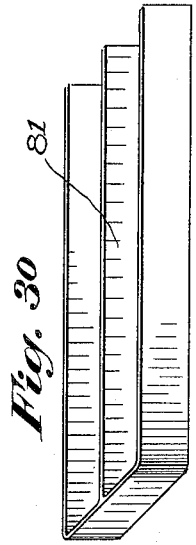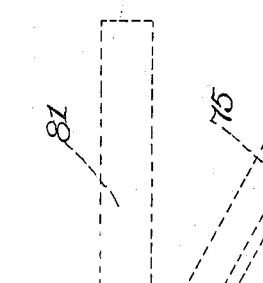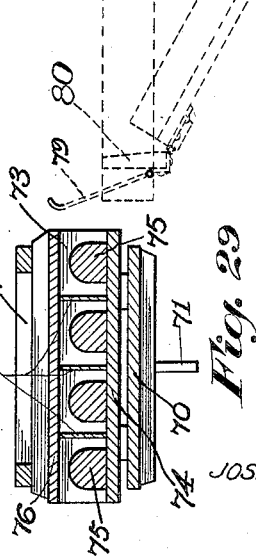

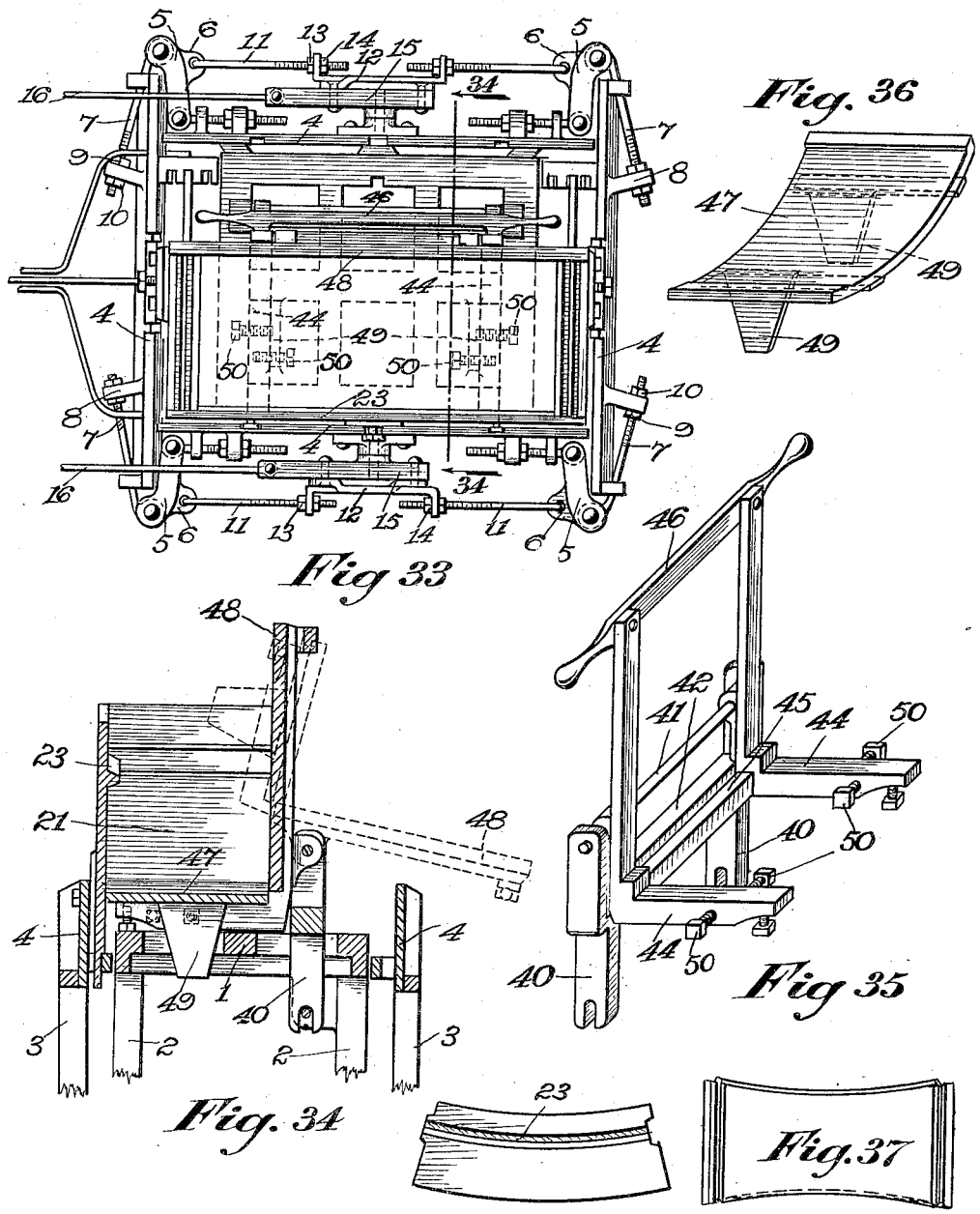

UNITED STATES PATENT OFFICE.

JOSEPH HENRY HOLLAND, OF CENTRETON, ONTARIO, CANADA.

CONCRETE-BLOCK-MOLDING MACHINE.

1,057,550.  Specification of Letters Patent.  Patented Apr. 1, 1913.

Application filed August 18, 1910. Serial No. 577,870.

*To all whom it may concern:*

Be it known that I, JOSEPH HENRY HOLLAND, a subject of the King of England, residing at Centreton, in the Province of Ontario, Canada, have invented certain new and useful Improvements in Concrete-Block-Molding Machines; and I do hereby declare that the following is a full, clear, and exact description of the invention, such as will enable others skilled in the art to which it appertains to make and use the same.

The invention to be hereinafter described relates to molding machinery and particularly to concrete block molding machinery.

Broadly speaking it comprises a supporting framework, a plurality of side boards or side members hinged to the framework, adjustable connections between the several side members, means for simultaneously moving all of said side members toward or from the center of the framework, a variety of pallets or bottom boards of various sizes and shapes adapted to be used with the supporting framework, a plurality of extension members of various shapes and sizes adapted to coöperate with the side members, and means for dividing the blocks into sections.

In order to more clearly disclose the construction, operation, and use of the machine, reference should be had to the accompanying drawings forming part of the present application.

Throughout the several figures of the drawings like reference characters designate the same parts.

Figure 2:
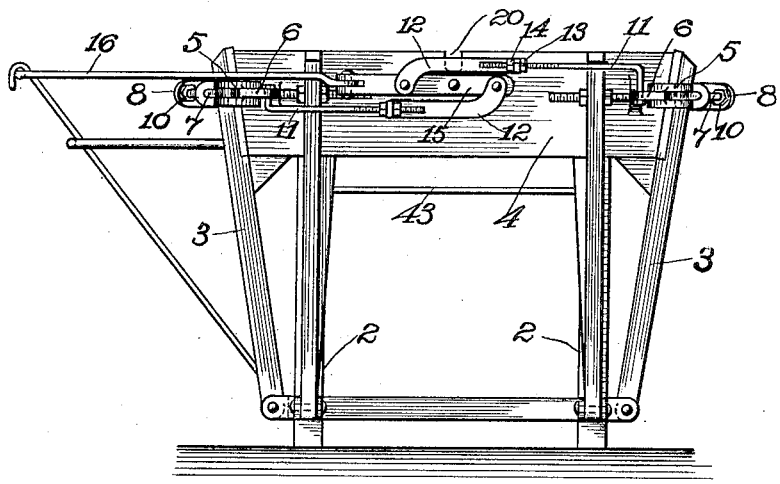
Figure 3:
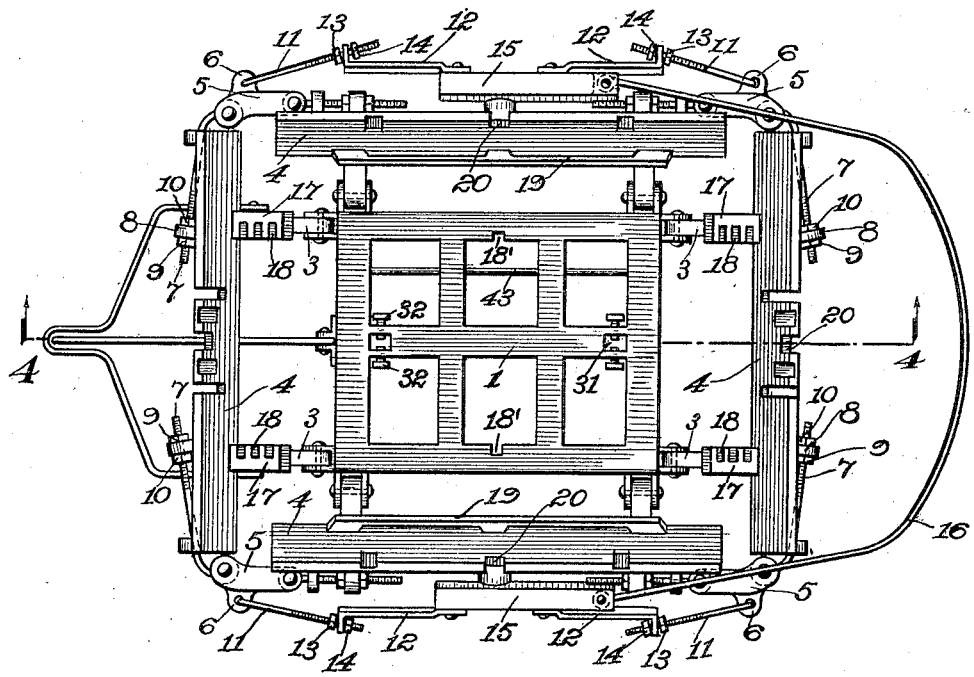
Figure 4:
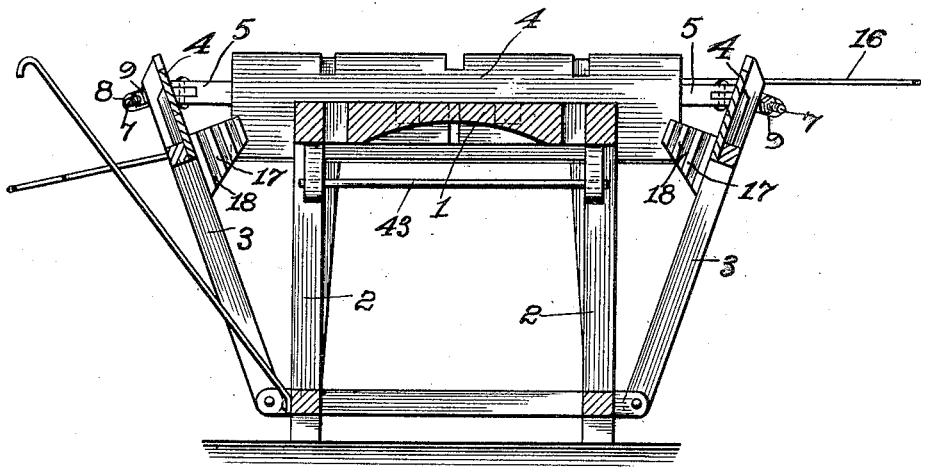

In the drawings: Figure 1 is a top plan view of the framework and side boards in closed or operative position; Fig. 2 is a side elevation of Fig. 1; Fig. 3 is a plan view similar to Fig. 1, with the parts in inoperative position; Fig. 4 is a vertical cross section on line 4—4 of Fig. 3, looking in the direction of the arrows; Figs. 5, 6, and 8 represent, in perspective views, a set of extension plates or members used with the side boards for molding plain blocks; Fig. 7 is a perspective view of a division plate which may be used with the side plates of Figs. 5, 6, and 8; Fig. 9 is a perspective view of a pallet or bottom board section adapted to be used with the members shown in Figs. 5 to 8; Fig. 10 is a perspective view of a divider; Figs. 11 to 16 both inclusive are perspective views of a set of extension members, division plate, and pallet, all adapted to be used with the side boards to produce curved interlocking blocks; Fig. 17 is a top plan view, in operative position, showing the application of the members of Figs. 11 to 16; Fig. 18 is a vertical cross section on line 18—18 of Fig. 17, looking in the direction of the arrows; Fig. 19 is a perspective view, reduced, of a block molded by the machine as shown in Figs. 17 and 18; Figs. 20, 21, and 22 are perspective views of a set of extension members adapted to be used with the side boards to produce blocks of considerable depth; Fig. 23 is a perspective view of a center core; Fig. 24 is a perspective view of a leveling board; Fig. 25 is a perspective view of one form of block molded by the machine; Fig. 26 is an end view of an attachment for molding drain pipes and the like; Fig. 27 is a side elevation of Fig. 26; Fig. 28 is the opposite end view of Fig. 26; Fig. 29 is a vertical cross section on line 29—29 of Fig. 27, looking in the direction of the arrows; Fig. 30 is a perspective view of a divider to be used with the drain pipe mold. Fig. 31 is a side elevation of the drain pipe mold, attached and in operation; Fig. 32 is a perspective of a complete drain pipe section; Fig. 33 is a top plan view, in operative position, of the machine with another set of extensions applied; Fig. 34 is a vertical cross section on line 34—34 of Fig. 33, looking in the direction of the arrows; Fig. 35 is a perspective of a cradle attachment; Fig. 36 is a perspective view of the pallet or bottom board shown in Fig. 34; Fig. 36[1] is a side elevation, reduced, of a block molded from the machine assembled as in Fig. 34; Fig. 37 is a top plan view of Fig. 36; Fig. 38 is a perspective view of a block molded with the use of the core shown in Fig. 23; Fig. 39 is a perspective view of the bottom section of the end member shown in Fig. 22; and Fig. 40 is a side elevation of the bottom section of the side extension member shown in Fig. 21.

The main objects of the invention are to provide a single, simply constructed, economical concrete block mold by which blocks of various sizes and forms may be quickly produced. To this end, a single supporting frame work is provided and adapted to support the various working parts. To this framework are hinged a set of side boards which coöperate with the supporting member to form the body of the mold. In order to enable variety in the production, a series of pallets or bottom boards of different shapes are provided for use on the supporting framework and a plurality of extension plates are provided for use with each side board.

Referring to the drawings in detail, 1 indicates a supporting table or framework mounted on substantial posts or legs 2. The lower end of each corner post is provided with brackets in which are hinged the lower ends of bars 3. To the upper ends of the bars are secured side boards 4. By swinging all of the boards 4 upward toward the vertical position, they will coöperate with the table 1 and form a complete mold box or casing. It is desirable, of course, to effect this movement of all of the side boards simultaneously. To that end, a specially constructed operating device has been provided, as will hereinafter appear. The adjacent ends of the several side boards are connected by links 5 each provided with a projecting perforated ear 6 forming an elbow about midway of the length of the link. In order to render the connection adjustable, it is made by means of threaded rods 7 pivotally connected to the opposite ends of the links and passed through perforated ears 8 projecting from the side boards. Adjustment is effected by means of nuts 9 and 10 threaded on to the rods and bearing against opposite faces of the ears 8. In the ear 6 of each link is pivotally secured the end of a connecting link 11 provided with a threaded end and adjustably connected to rod 12 by means of nuts 13 and 14 threaded on the end of the link and bearing against the opposite faces of the upturned perforated end of the rod 12. The opposite ends of the rods 12 are pivotally connected to ends of toggle lever blocks or levers 15 which are journaled in opposite side boards. The toggle lever blocks are connected together by a single operating handle or lever 16. As this handle is swung from the position of Fig. 3 to the position of Fig. 1, the links 5 will act to draw the side boards inward to the position shown in Fig. 1.

Two of the side boards are each provided with supporting blocks 17 each having a series of grooves 18 adapted to selectively receive removable extension members, as will hereinafter appear. The other two side boards are provided with bars 19 slightly spaced to leave passages for the reception of the lower edges of extension members. In order to further secure the extension members in place, each side board is provided with a notch 20 to receive the shank of a screw or like device projecting from the back of the extension member.

We will assume that it is desired to mold a single large plain concrete block of comparatively little thickness: To do this, the side boards will be moved to the position shown in Fig. 3. Then a plain pallet or bottom board of the same size as the top of the support 1 will be arranged thereon. Next, two plain extension members 21 will be arranged with their lower edges in the innermost grooves 18 and their screw shanks 22 resting in the notches 20. Then the side extension members 23 will be arranged so that their projecting tongues 24 will slide between the space bars 19 and the side boards, their screw shanks 22 being seated in the notches 20, just as in the case of the other extension members. In order to hold the extension members 21 solidly in their innermost positions, adjusting set screws 25 are provided. These screws are threaded into blocks 26 secured to the backs of the side members 21 and their heads are adapted to engage the inner face of the adjacent side board and thereby hold the extension member spaced therefrom, at its upper edge, as well as at its lower edge where it is so held by being seated in the grooves 18. With the parts so assembled, it is only necessary to swing the handle 16 to the position shown in Fig. 2. The mold is then ready to receive the cement. Should it be desired to mold a block of the same general type but only half the length, it will be necessary to substitute for the single pallet or bottom board two bottom boards 27. With these smaller bottom boards is also used the small plain division board $21^1$ provided with tongues $24^1$ adapted to fit into grooves $18^1$ in the framework. The division board, of course, fits down flush against the framework 1 and between the edges of the bottom boards 27, when they are in position.

Should it be desired to divide either of the plain blocks (molded as above) into sections, a divider 28 may be used. The side members 21 and the division plate $21^1$ are each provided with vertical slots 29 adapted to receive the blades of the divider as it is forced downward through the material in the mold. On the other hand, should it be desired to mold interlocking, curved blocks, the parts shown in Figs. 11 to 16 will be substituted for the parts used in molding the plain blocks. On referring to Figs. 11 to 16, it will be seen that the members 21 have inwardly inclined upper portions to form the end of the block and that these members are also provided with tongue and groove, respectively, to form reverse tongue and groove members on the blocks. The side members 23 and the division plate 30 are also provided with tongue and groove members for a like purpose. The division plate 30, when in position, is adapted to extend from one section 21 to the other. It is provided with tongues $30^1$ adapted to pass through holes 31 in the frame 1 and to be clamped in place by set screws 32. Bottom boards 27, with curved upper surfaces, are arranged on the top of the frame 1 between the sections 21, 23, and 30, as shown in Figs. 17 and 18. The curved face of the pallet sections or bottom boards 27 and the curved upper edges of the members 23 and 30 provide parallel curved surfaces for the blocks.

Should it be desired to mold narrow blocks of very considerable depth, a special cradle attachment may be used with the supporting frame. This attachment, and its use and operation, are more clearly disclosed by Figs. 33 to 37, both inclusive. Referring particularly to these figures, 40 indicates two or more notched legs connected by a rod 41 and a cross-bar 42. These notched legs are adapted to fit over and rest upon a supporting rod 43 extending longitudinally beneath the framework 1. Pivotally mounted on the frame 41 is the cradle proper, comprising two L shaped members 44 connected together by a bar 45 and a handle 46. The horizontal arms of the L shaped members are adapted to support face plates 47, while the vertical arms are adapted to support pallets 48. The face plates 47 are provided with ears 49 adapted to be secured to the horizontal arms of the L shaped members, by means of screws 50 or the like. The extension section 23, in this form, is of the required width to give the necessary depth to the molded block and may be provided with a tongue, groove, or other formation to provide an interlocking part in the molded block. The remaining extension members 21, of course, are made of the required dimensions and may be similarly provided with tongue and groove forming portion.

It may be desired to mold blocks of the same width and length as those molded by the machine when assembled as in Figs. 33 and 34, and yet of various other thicknesses and constructions. To this end, the side extension members may comprise several parts detachably connected, as in Fig. 21. This figure shows three parts, 51, 52, and 53. Part 51 is provided with the tongue 24 for use as previously disclosed, and a space bar 54 adapted to receive between it and the part 51, the posts 55 projecting downwardly from the part 52, which is likewise provided with the space bar 56 to receive between it and the part 52 the projecting posts 57 of the part 53. In this manner, the side extension member may be built up or reduced to suit circumstances. The adjacent sections, taking the place of sections 21, are similarly constructed and arranged, of course.

In many cases, with blocks of considerable thickness, it may be desired to provide hollows or very deep cavities in one or more faces of the block. To this end, one part of each of the sections 21 (Figs. 20 and 22) may be provided with cores. One of the cores may be made as a single piece or shell 58 of the desired shape, and provided with small end pins 59 adapted to be slidably received in corresponding sockets or holes in the section to which it is attached. In order to adjust this core horizontally to vary the depth of the cavity in the face of the block, a double ended screw 60 has been provided, one end bearing in the face of the extension member while the opposite end bears in the end face of the core. Rotation of the screw, of course, causes movement of the core. The core connected to the opposite extension member, however, is not an integral or one piece shell. It comprises two sections; section 61 rigidly secured to one part of the extension member, and section 62 overlapping section 61 and adjustably connected thereto by the double ended screws 63. By rotating the screws 63, the core may be expanded or contracted as desired, to increase or diminish the width of the cavity made by the core. As shown in Figs. 20 and 22, these cores may be arranged so that cavities formed by them will not be directly opposite, but one above the other relatively to the thickness of the block. At the same time, it may be desired to form a passage or opening through the block. For this purpose, a central core is provided, adapted to extend from one extension member through the cradle to the opposite member. This core comprises two core sections 64 and 65 with the edges of one overlapping the edges of the other. The section 65 is provided with a series of screws 66 threaded into its corners with their heads so arranged as to engage the corners of the section 64 when the section 64 is fitted down over the section 65. In this way, the sections will be spaced apart. In order to draw the section 64 down on to the heads of the screws 66, tightening screws 67 are provided. These screws 67 pass through the corners of the section 64 from the outside and are threaded into the corners of the section 65. Consequently, by tightening the screws 67, the two sections 64 and 65 may be drawn tightly together. By turning the screws 60 in or out, before the section 64 is clamped in place, the sides of the core may be varied to suit circumstances.

It is desirable, of course, to have the extension members braced or held solidly in place. For this purpose, the extension members or the lower sections thereof, may be provided with set screws 68 adapted to slip downwardly into sockets or recesses 69 in the side boards 4. These set screws may be turned or adjusted so as to take up any slack or space between the side board and extension member, and hold the extension member solid and parallel with the face of the side board.

If it is desired to mold drain pipe sections or the like, a special attachment is used. This attachment is more clearly shown in Figs. 26 to 31, both inclusive. Referring to these figures, 70 indicates a base board provided with ears 71 projecting downwardly therefrom and adapted to pass through openings 31 in the frame 1, to be engaged by the clamping screws 32 to be held in place. Extending upwardly from one end of the base board, at right angles thereto, are a set of brackets 72 in which is mounted a rod on which is hinged an end block 73. To the edge of the block 73 is hinged one end of a pallet 74 provided with a plurality of longitudinal core members 75 for forming the boards of the pipe sections. A plain pallet 76 is used for the top and is held tightly in position by means of the pressure frame 77 hinged on the rod which is mounted in the brackets 72. This frame is forced to operative position by means of a lever 78 pivoted thereon and engaging a staple 79 carried by an end gate 80 hinged to the free end of the pallet 74.

In order to separate the pipe sections from each other as they are molded, a divider 81 is used. The blades of this divider fit into slots in the end gate 80 when the mold is closed. When the mold is open and the divider removed, the pipe sections will all be separate. By having the several parts of the attachment hinged, as described, it is possible to swing it to and from operative position, as desired, thus making it possible to discharge the molded pipe sections on to the plain pallet 76, as soon as they are finished.

It is thought that the operation and use of the invention, and its several parts, will be clear from the preceding detailed description.

Changes may be made in the construction, arrangement, and disposition of the several parts of the invention without in any way departing from the field and scope of the same and it is meant to include all such within this application wherein only a preferred form has been disclosed.

Having thus fully described my invention, what I claim as new and desire to secure by Letters Patent is:

1. A mold for plastic material comprising extension members and movable side-boards recessed to engage and hold the same, in combination with movable supports for said side-boards, corner connections between said side-boards and means for moving said side-boards at will inward or outward to close or open the mold.

2. A mold for plastic material comprising extension members, movable side-boards, two of which have a series of grooves for the reception of said extension members, the other two side-boards being slightly spaced for the same purpose, all of said side-boards being also notched in their tops to receive attachments to said extension members, in combination with devices for supporting said side-boards and a handle and connections for moving said side-boards toward each other or away from each other at will.

3. A mold for plastic material comprising extension members, side-boards which are notched on their top to receive attachments of said members and otherwise adapted to receive and hold the latter, in combination with means for moving the said side-boards toward each other or away from each other for closing or opening the mold.

4. A mold for plastic material comprising movable side boards, two of which have a series of grooves for the reception of extension members, the other two side boards being slightly spaced for the same purpose, all of said side boards being also notched in their tops to receive attachments of said extension members, in combination with means for supporting the bottom of the mold, additional movable means for supporting the said side boards, a handle for moving said side boards toward or away from each other as it is raised or lowered, levers attached to said handle, devices connecting the side boards so that they will move together and connections between said levers and said devices arranged to effect the above mentioned operation of the side boards by the said handle.

5. A mold having four laterally movable side boards, in combination with a pair of lever blocks pivoted at their middles to an opposite pair of these boards, two pairs of rods having reversely bent ends by which each pair of them is pivoted to one of said lever blocks on opposite sides of its pivot, links provided with elbows and arranged at the corners of the mold, devices connecting these links to the other side boards and a bent handle having its ends connected pivotally to the ends of said levers in order that its movement in one direction may cause them to operate the side boards simultaneously for closing the mold and its movement in the other direction may reverse this operation.

In witness whereof I have hereunto set my hand in the presence of two witnesses.

JOSEPH HENRY HOLLAND.

Witnesses:
  J. G. JACKSON,
  F. D. BOGGS.

Copies of this patent may be obtained for five cents each, by addressing the "Commissioner of Patents, Washington, D. C."